INVENTOR
FRANK TYSON
BY
Albert L. Ely
ATTORNEY

Aug. 3, 1937.  F. TYSON  2,089,078
TAPER ATTACHMENT FOR LATHES
Filed May 20, 1936  4 Sheets-Sheet 3

INVENTOR
FRANK TYSON
BY
Albert L. Ely
ATTORNEY

Aug. 3, 1937.　　　　F. TYSON　　　　2,089,078
TAPER ATTACHMENT FOR LATHES
Filed May 20, 1936　　　4 Sheets-Sheet 4

INVENTOR
FRANK TYSON
BY Albert L. Ely
ATTORNEY

Patented Aug. 3, 1937

2,089,078

UNITED STATES PATENT OFFICE 2,089,078

TAPER ATTACHMENT FOR LATHES

Frank Tyson, Canton, Ohio

Application May 20, 1936, Serial No. 80,722

6 Claims. (Cl. 82—12)

This invention relates to taper attachments for lathes such as may be provided for automatically machining tapered or coned surfaces on metal structures both exteriorly thereof and in bores therein.

The chief objects of the invention are to provide attachments of the character mentioned that may be easily and quickly mounted on and removed from the lathe; that are applicable to lathes of standard make without requiring material alteration of the latter; that have a wide range of angular adjustability so as to cut practically any taper desired; to provide against back lash or lost motion so that uniformity of cut is achieved; and to provide an apparatus of the character mentioned wherein power is applied to the cutting tool by mechanism disposed in the plane of movement of the tool, in all positions of angular adjustment thereof, to the end that torsional strain in the apparatus is obviated. Other objects will be manifest.

Of the accompanying drawings.

Figure 1:
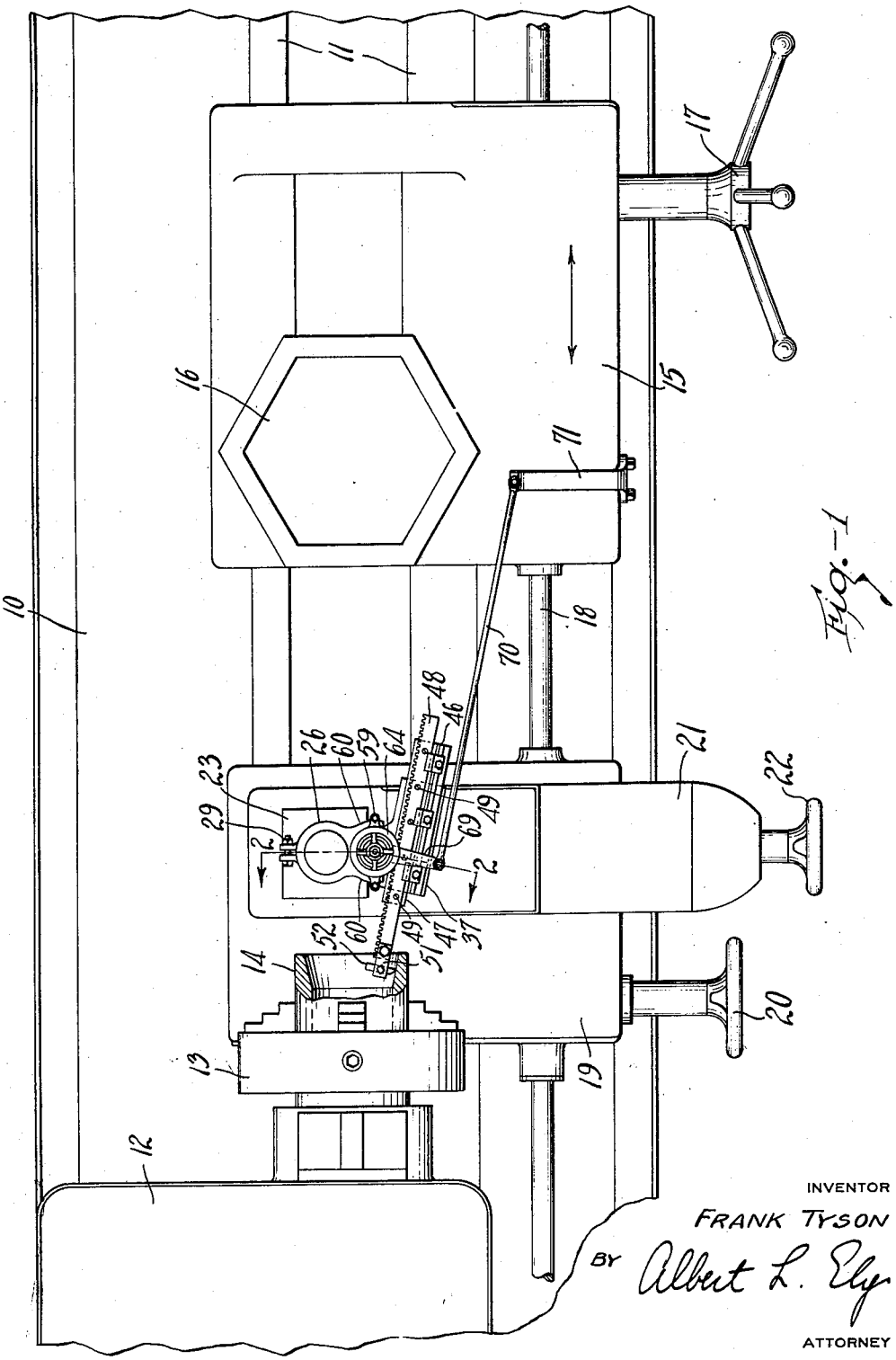
Figure 1 is a plan view of one embodiment of the invention and a fragmentary portion of a turret lathe upon which it is operatively mounted.
Figure 2:
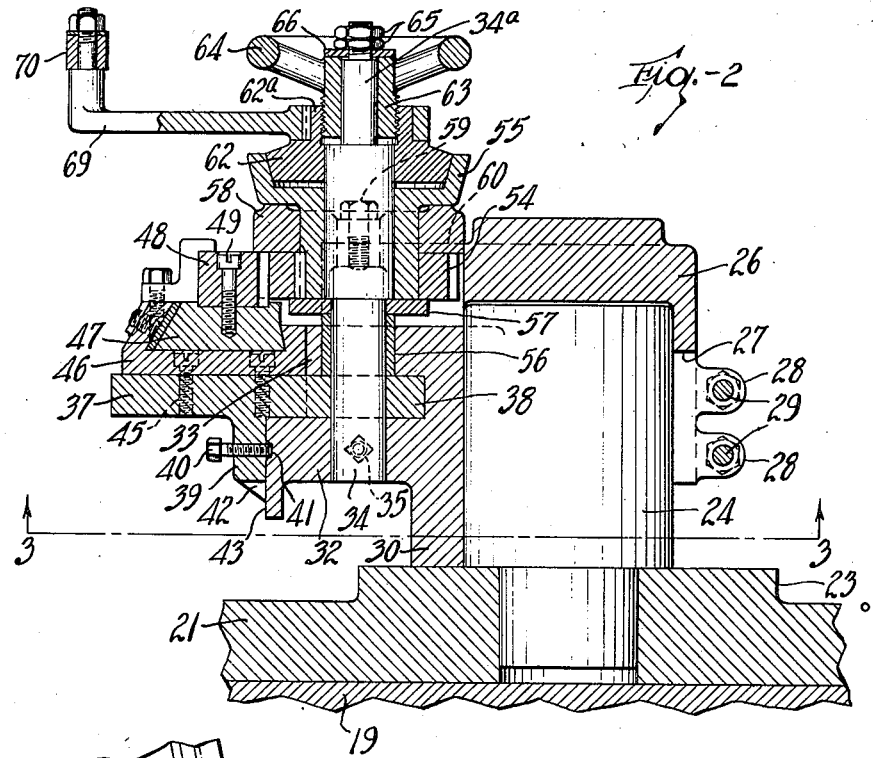
Figure 2 is a section, on a larger scale, taken on the line 2—2 of Figure 1.
Figure 3:
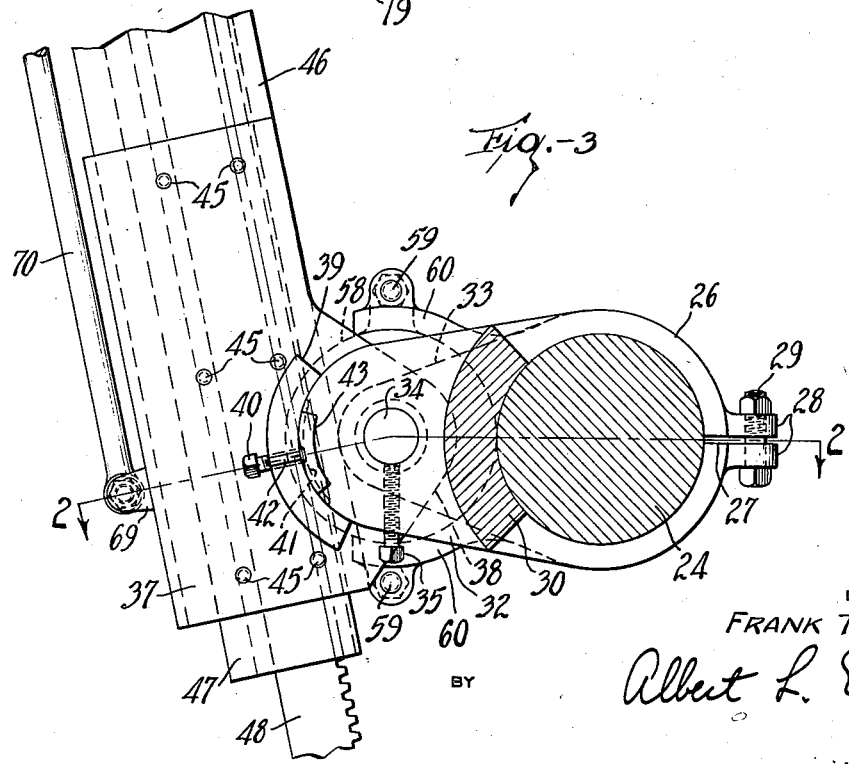
Figure 3 is a section on the line 3—3 of Figure 2.

Referring now to Figures 1 to 3 of the drawings, there is shown a turret lathe of standard construction comprising a bed 10 formed with longitudinal slideways 11, and an integral headstock 12 at one end of said bed. Extending from the headstock 12 over the slideways 11 is a driven spindle that carries a rotatable work-holding chuck 13, the latter being shown with a work-unit 14 mounted therein. At the opposite end of the lathe from the headstock 12, a turret slide 15 is mounted upon the slideways 11, said slide carrying the usual fixed center turret 16. A pilot wheel 17 is provided for manually adjusting the position of the slide 15 longitudinally of said slideways, and a feed shaft 18 automatically reciprocates the slide. Mounted upon the slideways 11, between the headstock 12 and the turret slide 15, is a cross-slide carriage 19 that is manually movable longitudinally of the slideways by means of the usual handwheel 20. Mounted upon the carriage 19 is a cross slide 21 that is manually movable transversely of the bed and slideways 11 by means of the usual feed screw (not shown) that is operated by the handwheel 22. Near one of its ends the cross slide 21 is formed with a square boss 23, and rising centrally therefrom is a fixed cylindrical post 24.

All of the foregoing equipment is of standard manufacture and need not be described in greater detail. The improved taper attachment constituting the subject matter of one embodiment of this invention is carried upon the cross slide 21.

As is most clearly shown in Figures 2 and 3, the taper attachment comprises a generally cylindrical cap-like fixture 26 that is suitably bored to fit over the post 24, and at one local region is formed with an axially extending slot 27, there being apertured ears 28 at each side of said slot for receiving bolts 29, 29 by means of which the fixture is clamped to the post 24 so as normally not to be movable relatively thereof, but to be capable of angular adjustment upon occasion. The fixture 26 is formed locally upon its bottom margin with a downwardly extending portion 30 that rests upon the boss 23 and provides additional support for a tool and tool operating mechanism presently to be described.

Projecting radially from the fixture 26, in the region of the supporting portion 30 and near the bottom of the fixture, is an integral bracket 32. A second integral bracket 33 is formed on the fixture 26 above bracket 33 and in spaced relation thereto. Extending through the free ends of brackets 32, 33 is a spindle 34 that is secured in lowermost bracket 32 by means of a set screw 35. The free ends of the brackets 32, 33 are rounded concentrically with the axis of spindle 34, the radius at the end of bracket 32 being considerably larger than the radius of bracket 33.

Supported upon bracket 32 is a slide-support 37 that is formed on one side, at the end thereof, with a laterally projecting ear 38 that fits nicely within the space between brackets 32, 33 and is swivelled on spindle 34. The bottom face of the slide support 37 is formed with a downwardly extending arcuate apron 39 that is concentric with spindle 34 and abuts the rounded free end of bracket 32, there being a cone-head set screw 40 threaded through said apron and adapted to engage in a slot 41 formed with tapered sides, which slot is formed in the arcuate end of said bracket. The arrangement permits angular adjustment of the support 37 relatively of the fixture 26, the extent of said adjustment being controlled by other factors subsequently to be explained.

Preferably the bottom face of the apron 39 is formed with a downwardly projecting indicator lug 42 that overlies the outer face of a short, arcuate lip 43 formed on the free end of bracket 32, said lip being suitably calibrated to indicate the angular position of the slide support with relation to the fixture 26.

Secured to the top face of the slide support 37, as by the screws 45, 45 is a dovetail slideway 46 that may overhang the end of said support remote from the ear 38. Mounted for longitudinal movement in the slideway 46 is a dovetail slide 47, and mounted upon the latter, in a shallow longitudinal recess in the top face thereof, is a rack 48 that extends substantially beyond both ends of said slide. The rack 48 is secured to the slide 47 by a plurality of cap screws 49, 49, and a plurality of Z-clamps are secured to the slideway 46 and abut a lateral and the top face of the rack 48 to strengthen the rack and slide against the forces set up during operation.

That end of the slide support 37 that carries the ear 38 is positioned on that side of the attachment that is nearest the work 14, so that the attachment may be positioned relatively close to the work. That end of the rack 48 that is closest the work has a tool fixture 51 secured thereto, and a tool 52 is removably mounted in said fixture 51.

The teeth of the rack 48 are on the side thereof nearest spindle 34, and mesh with a pinion 54 that is keyed to the hub portion of the cup member 55 of a cone clutch, said cup member being journaled upon the spindle 34. A sleeve-bushing 56 is mounted in the bracket 33 about the spindle 34, the upper end of said bushing supporting a wear-disc 57 that bears against the lower end face of clutch member 55 and adjacent bottom face of pinion 54. Overlying the pinion 54 and retaining it in place on the wear disc 57 is a cap 58 that is secured, by a pair of cap-screws 59, 59, to arcuate bracket-like arms 60, 60 formed integral with the fixture 26 and extending more than half-way about the periphery of the pinion 54. The cap 58 also assists in supporting the clutch member 55, the cup portion of which rests upon an annular finished surface on the top of the cap.

The plug or cone member 62 of the aforementioned cone clutch is journaled upon spindle 34, above cup-member 55, said plug member having a concentric, upwardly extending, axial portion 62a that is interiorly threaded to receive the exteriorly threaded hub portion 63 of a handwheel 64. Said handwheel is journaled upon the spindle 34, which is of reduced diameter, as shown at 34a, Figure 2, in its upper end portion. The handwheel 64 is retained upon the spindle by means of lock-nuts 65, there being a thrust washer 66 interposed between said lock-nuts and the upper end of the handwheel hub 63. The arrangement is such that by rotating the handwheel 64 the cone clutch member 62 may be moved axially along spindle 34 so as to have frictional driving engagement with cup member 55, whereby oscillating movement of the clutch members will impart longitudinal reciprocatory movement to the rack 48 and tool 52.

For imparting oscillating movement to the cone clutch, a crank 69 is secured upon the axial extension 62a of cone member 62, the free end of said crank being pivotally connected to one end of a link 70. The other end of link 70 is pivotally connected to a bracket 71 secured to the turret slide 15, the arrangement being such that the reciprocating movement of the latter imparts oscillating movement to the crank 69 which in turn reciprocates the rack 48.

It is believed that the operation of the taper attachment readily will be apparent from the foregoing description. Usually the fixture 26 is so angularly mounted upon post 24 that the latter and spindle 34 are in alignment in the central longitudinal plane of the cross slide 21. The slide support 37 is angularly adjustable about 18° each way from a position that is at right angles to the said central longitudinal plane of the cross slide. The angular adjustability of said support 37 relatively of fixture 26 is limited by the ends of the respective arms 60 of the fixture, said ends being abutted by the slide 47 at the opposite limits of adjustment of said slide support. The range of adjustability of the slide support usually is sufficient to cut the desired taper on the work, but if greater taper is desired the fixture 26 may be adjusted angularly on the post 24 simply by loosening the clamping screws 29. By turning the handwheel 64 the cone member 62 may be loosened and thereafter turned angularly, together with crank 69 thereon, relatively of clutch member 55, the arrangement providing an adjustment by means of which the feed of the cutting tool 52 more accurately may be controlled in its various angles of operation, and also providing means for rendering the taper cutting attachment inoperative if desired.

The construction of the apparatus is such that power is applied to the tool by mechanism disposed in the plane of the tool in all positions of adjustment of the apparatus, thereby substantially eliminating torque and making for uniformity of operation. The tool moves into and out of engagement with the work with each reciprocation of the turret slide 15, any back lash in the gears being taken up before the tool engages the work so that a true and uniform cut is made. The attachment may be handled as a complete unit in mounting it upon or removing it from the cross slide, and it achieves the other advantages set out in the foregoing statement of objects.

Figure 4:
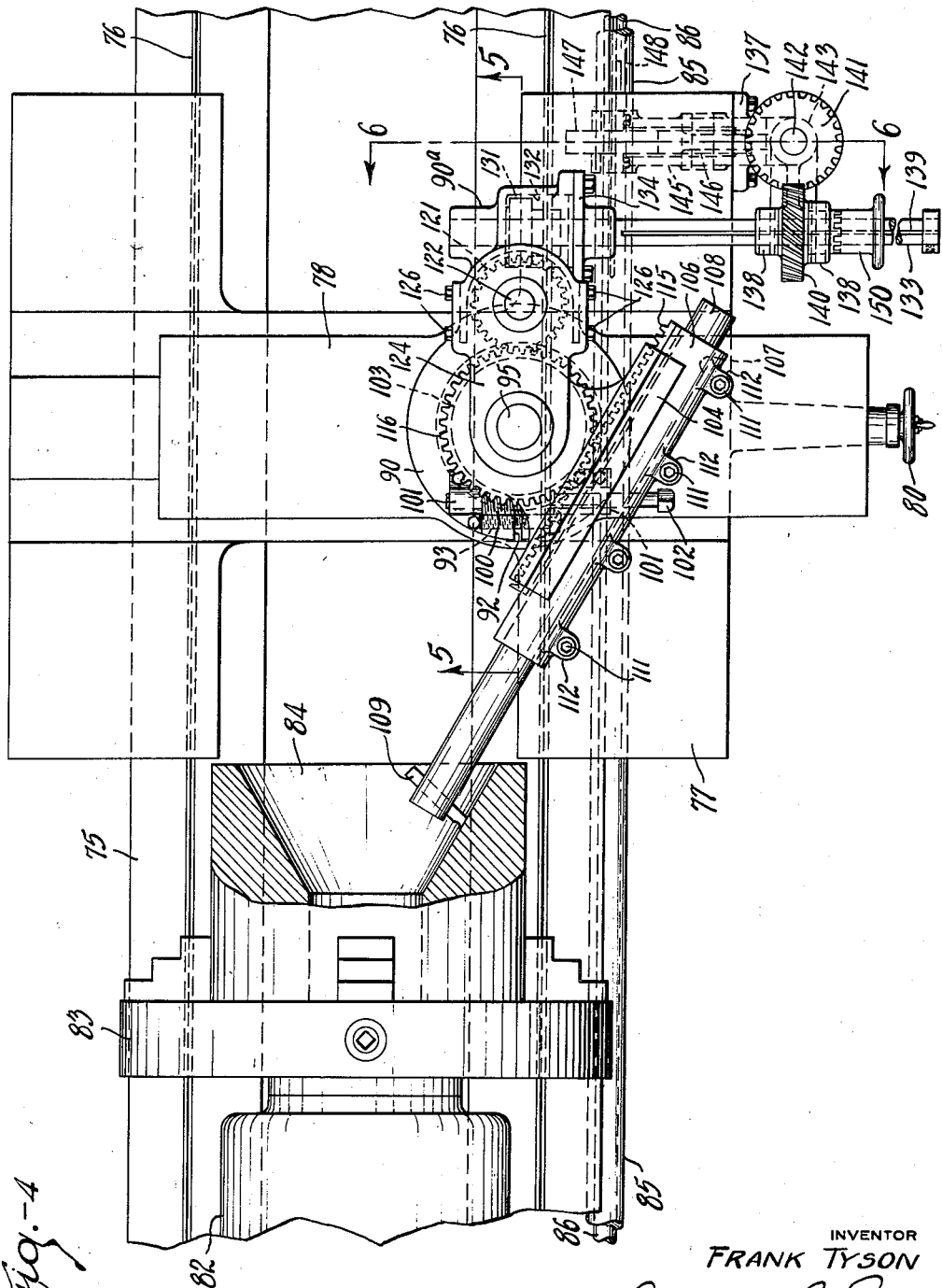
Figure 4 is a plan view of another embodiment of the invention, and a fragmentary portion of an engine lathe upon which it is operatively mounted.
Figure 5:
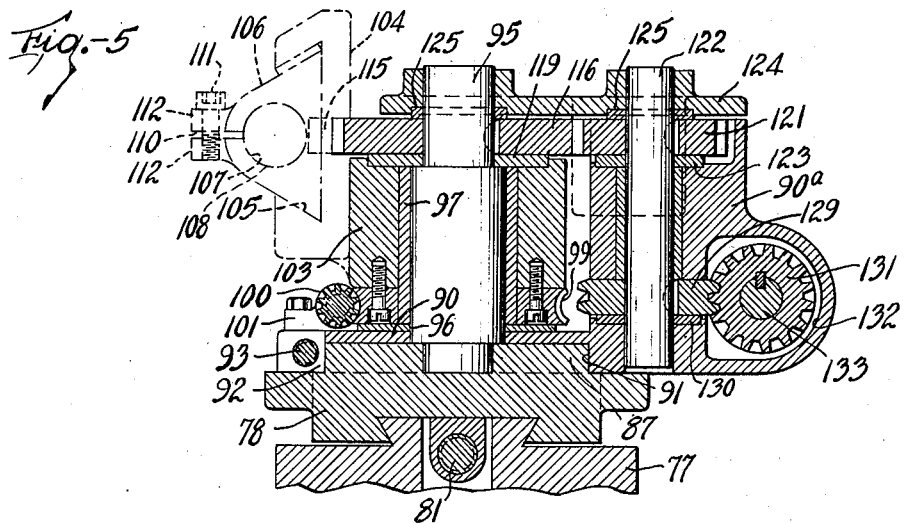
Figure 5 is a section on a larger scale, taken on the line 5—5 of Figure 4.
Figure 6:
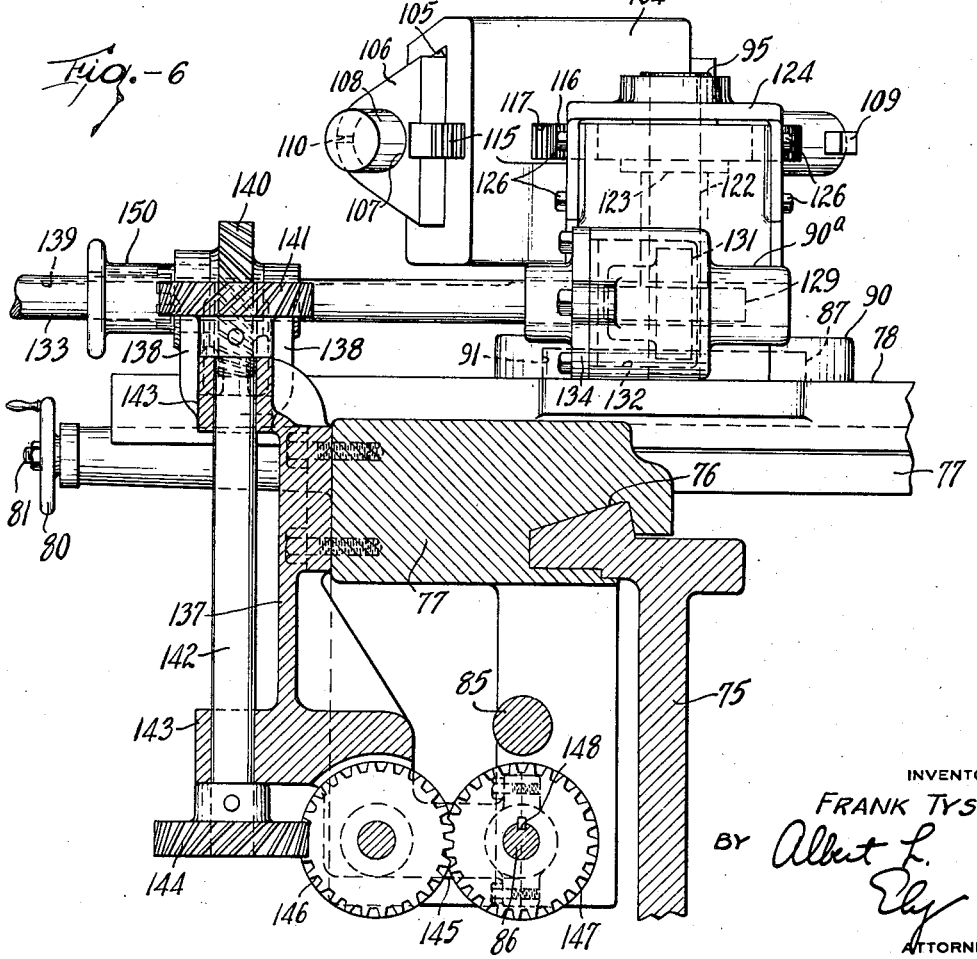
Figure 6 is a section, on a larger scale, taken on the line 6—6 of Figure 4.

In Figures 4 to 6 of the drawings is shown another embodiment of the invention, which embodiment is especially applicable for use on engine lathes. The engine lathe shown comprises the usual bed 75, slideway 76, a cross-slide carriage 77 mounted on said slideways, and a cross slide 78 mounted upon said carriage. A handwheel 80 on the end of a screw 81 is provided for moving the cross slide 78 upon its carriage 77, transversely of the lathe. At one end the bed 75 is formed with the usual headstock 82, and projecting therefrom, over the slideway, is a rotatable spindle that carries a work-holding chuck 83, the latter being shown with a work-unit 84 therein. Extending longitudinally of the machine, along the front side thereof, is the usual lead screw 85 and feed rod 86, the latter having suitable driving connections (not shown) by which it rotates a determinate number of revolutions in one direction and then reverses and rotates the same number of revolutions in the opposite direction. The top face of the cross slide 78 is formed with the usual circular boss 87.

The taper attachment used on the above-described lathe comprises a fixture 90 that rests upon the top face of the cross slide 78 and is recessed on its under side at 91 to receive the boss 87 on said cross slide. The fixture 90 is radially slotted at 92, and suitable cap-screw 93 traverses said slot for the purpose of clamping said fixture tightly upon said boss. At one side the fixture 90 is formed with an integral journal bracket portion 90a, said fixture being so angularly positioned that bracket portion 90a overhangs the lateral margin of the cross slide 78 on the side thereof remote from the work 84. A spindle 95 having end portions of reduced diameter has its lower end portion rotatably mounted in a suitable axial recess in boss 87. The spindle 95 extends upwardly through an aperture of proper size in the fixture 90, and there is a thrust washer 96 positioned upon the top face of the fixture, about said spindle, and a bushing 97 about the spindle extending upwardly from the thrust washer 96 to the reduced upper end portion of the spindle, as shown in Figure 5.

Journaled upon the bushing 97, with its bottom face resting upon washer 96, is a worm gear 99 that is in mesh with a worm 100, the latter being journaled in bearing brackets 101, 101 that are mounted upon the fixture 90. One end of worm 100 is extended considerably beyond its bearing and has a square end portion 102 for receiving a socket wrench or other suitable tool by which it may be rotated, for rotating worm gear 99 about spindle 95. Journaled upon bushing 97 and secured to the top face of worm gear 99 is a relatively thick sleeve 103 that is formed with an integral, tangentially disposed, slide support 104. The latter is formed, in its outer lateral face, with a horizontal, longitudinally extending dovetail slideway 105, and mounted in the latter is a dovetail slide 106. The slide 106 is formed with a longitudinally extending bore 107 in which is mounted an elongate, cylindrical tool holder 108 that carries a suitable cutting tool 109 in the end thereof adjacent the work 84. The slide 106 has a longitudinal slot 110 extending into the bore 107 and bolts 111 engaging respective ears 112 on opposite sides of said slot are provided for clamping the tool holder 108 within the bore 107.

For reciprocating the slide 106, a rack 115 is mounted in a longitudinally extending recess in the inner face thereof, and the adjacent surface of the slideway 105 may be longitudinally recessed to receive the toothed side of said rack. The rack 115 is meshed with a pinion 116 that has access to the rack through a slot 117, Figure 6, formed in the rear wall of the slide support 104. The pinion 116 is keyed upon the reduced upper end portion of spindle 95 and rests upon a thrust washer 119 mounted upon the upper end of sleeve 103 and bushing 97.

The pinion 116 is meshed with a gear 121 that is keyed to the upper end portion of a vertical countershaft 122 that is journaled in the bracket portion 90a of the fixture 90, said gear resting upon a thrust washer 123 therein. The gear 121 and pinion 116 are securely retained in place by means of a cap 124 that overlies said gear and partly overlies said pinion, there being suitable thrust washers 125 positioned between the cap and the respective gear and pinion. The cap 124 is apertured to receive the upper end portions of spindle 95 and countershaft 122, and is secured to bracket structure 90a by cap screws 126, 126. The cap 124 also serves to impart rigidity to the upper end portion of said bracket structure.

Also keyed to the countershaft 122, below the gear 121 in a suitable slot formed in bracket structure 90a, is a spiral gear 129 that rests upon a thrust washer 130 in said bracket structure. The spiral gear 129 is meshed with a spiral gear 131 that is positioned in a suitable recess 132 formed in said bracket structure, said gear 131 being mounted upon a horizontal shaft 133 that has one end journaled in said bracket structure, and extends therefrom toward the front of the lathe. There is a cover 134 over the recess 132.

Mounted upon the front face of the cross-slide carriage 77 is a bracket of irregular shape generally designated 137, and extending laterally and upwardly on said bracket are spaced arms 138, 138 in which the shaft 133 is journaled for rotary and axial movement. The shaft 133 is formed with an elongate keyway 139, and journaled on said shaft, between arms 138, is a spiral gear 140. On one side of gear 140 the hub thereof extends through an arm 138 and is formed with clutch teeth that are engageable with complementally shaped teeth formed on one end of a manually movable clutch member 150 that is slidably keyed for axial movement upon shaft 133. The gear 140 is meshed with a spiral gear 141 that is mounted upon the upper end of a vertical shaft 142 that is journaled in suitable bearing portions 143, 143 of bracket 137, the lower end of shaft 142 being provided with a spiral gear 144. The lower end portion of bracket 137 is formed with a rearwardly extending, bifurcated, bearing structure 145 in which is journaled an idler spiral gear 146 that is meshed on one side with spiral gear 144, and on the opposite side with a spiral gear 147 that is keyed to feed rod 86. The bearing structure 145 straddles the gear 147 so as to move the latter longitudinally of the feed rod 86 when the cross-slide carriage 77 moves longitudinally of the lathe, and said feed rod is formed with an elongate keyway 148, Figure 4, permitting such lateral movement of the gear 146.

In the operation of the device, the feed rod 86 is suitably connected with power means, in the usual manner, so that it rotates for a determinate interval in one direction, and then reverses and rotates for a determinate interval in the opposite direction. The gearing of the device is of such ratio that the tool 109 is fed into the work 84 while the feed rod rotates in one direction and withdrawn therefrom while it rotates in the opposite direction. By means of the clutch 150 the feed of the tool may be halted while the feed rod continues its rotation, thus allowing for gauging of the work. The device is adjustable so as to cut tapers up to 30°, and thus is available for most all taper-cutting operations. The cross-slide carriage 77 may be moved longitudinally of the bed 75, and the cross slide 78 may be moved transversely of the said carriage while the device is in operation. The device may be handled as a unit, and is easily mounted upon the lathe and removed therefrom. The embodiment of the invention shown in Figures 4 to 6 possesses substantially all of the advantages of the device shown in Figures 1 and 2, which advantages are set out in the foregoing statement of objects.

Modification may be resorted to without departing from the spirit of the invention or the scope of the appended claims, which are not limited wholly to the specific construction shown and described.

What is claimed is:

1. In apparatus for cutting tapers, the combination with an engine lathe comprising the usual cross-slide carriage, cross slide thereon, rotatable work-holding chuck, and feed rod driven periodically in opposite directions, of a taper cutting attachment removably mounted as a unit upon said cross slide, said attachment comprising a rack and pinion, a cutting tool having operative connection with said rack, and driving means connecting said pinion with said feed rod whereby the periodic rotation of the latter in opposite directions oscillates said pinion, and thereby reciprocates the cutting tool from and toward the work in the chuck.

2. In apparatus for cutting tapers, the combination with a lathe comprising a cross slide, a post projecting upwardly therefrom, and a power member moving periodically in opposite directions, of a fixture mounted upon said post and adjustable angularly about the axis thereof, a vertical spindle carried by said fixture in offset relation to said post, a slide support adjustable angularly about the axis of said spindle, a slide on said slide support, a cutting tool carried by said slide, a rack attached to said slide, a pinion coaxial with said spindle and meshed with said rack, and means for oscillating said pinion through the agency of the aforesaid power means.

3. In apparatus for cutting tapers, the combination with a turret lathe comprising a reciprocating turret slide, a cross slide, and a post projecting upwardly from the latter, of a fixture mounted upon said post and adjustable angularly about the axis thereof, a vertical spindle carried by said fixture in offset relation to said post, a slide support adjustable angularly about said spindle, a slide on said slide support, a cutting tool carried at one end of said slide, a rack extending longitudinally of said slide, a pinion coaxial with said spindle, a crank arm having operative connection with said pinion, and a link connecting said crank arm to said turret slide, whereby reciprocation of the latter oscillates said crank arm and pinion to effect reciprocation of the cutting tool.

4. A combination as defined in claim 3 including a clutch between the pinion and the crank arm, and means on the end of the spindle for manually operating said clutch.

5. In apparatus for cutting tapers, the combination with a lathe comprising a cross slide, and a power driven member moving periodically in opposite directions, of a taper cutting attachment removably mounted upon said cross slide and comprising a vertically arranged spindle, a slide support adjustable angularly about the axis of said spindle, a slide in said slide support, a cutting tool carried by said slide, a rack extending longitudinally of said slide, a pinion arranged coaxially of said spindle and meshed with said rack, and means operatively connecting said pinion with said power driven member to oscillate said pinion and thereby to reciprocate said slide.

6. In a taper cutting device for lathes, the combination of a vertical spindle mounted upon the adjustable cross slide of the lathe, a power element consisting of a gear journaled upon said spindle, a tool carrying member consisting of a rack meshed with said gear and adjustable about the axis of said gear to vary the angle of the rack with relation to the work in the lathe, and means for oscillating said gear to impart reciprocating movement to the rack and tool, said means being independent of the cross slide and operable in all positions of the latter.

FRANK TYSON.